US007044310B2

(12) United States Patent
Yi

(10) Patent No.: US 7,044,310 B2
(45) Date of Patent: May 16, 2006

(54) HANGING POP-UP MEDIA TRAY

(76) Inventor: Su Yong Yi, 738 Design Ct., #302, Chula Vista, CA (US) 91911

( * ) Notice: Subject to any disclaimer, the term of this patent is extended or adjusted under 35 U.S.C. 154(b) by 166 days.

(21) Appl. No.: 10/684,977

(22) Filed: Oct. 10, 2003

(65) Prior Publication Data
US 2004/0124162 A1 Jul. 1, 2004

Related U.S. Application Data

(60) Provisional application No. 60/417,948, filed on Oct. 12, 2002.

(51) Int. Cl.
*A47G 29/00* (2006.01)
(52) U.S. Cl. .................................................. 211/40
(58) Field of Classification Search .............. 211/40, 211/41.12, 59.2, 59.3, 51; 206/308.1
See application file for complete search history.

(56) References Cited

U.S. PATENT DOCUMENTS

| 3,889,817 A | * | 6/1975 | Berkman | 211/163 |
| 4,121,877 A | * | 10/1978 | Brown | 312/9.23 |
| 6,557,710 B1 | * | 5/2003 | Levine | 211/40 |
| 6,848,588 B1 | * | 2/2005 | DeNatale, Jr. | 211/163 |

* cited by examiner

*Primary Examiner*—Sarah Purol
(74) *Attorney, Agent, or Firm*—Charmasson, Buchaca & Leach, LLP

(57) ABSTRACT

A rack for contiguously storing and displaying a stack of symmetrical objects having parallel and planar opposite faces such as compact discs jewelcases. The rack comprises a toggling mechanism at the bottom of each storage location that raises the object above the adjacent others in response to a light pushing movement in order to facilitate pulling the object our of the rack.

14 Claims, 2 Drawing Sheets

HANGING POP-UP MEDIA TRAY

PRIOR APPLICATION

This claims the benefit of U.S. Provisional Patent Application Ser. No. 60/417,948 filed Oct. 12, 2002.

FIELD OF THE INVENTION

This invention relates to storage devices and filing cabinets, and more particularly to racks used to store and display consumer electronic storage media such as compact discs held in their so-called "jewelcases".

BACKGROUND OF THE INVENTION

Storage and display racks for symmetrical objects that have parallel and planar opposite faces such as the so-called "jewelcases" of compact discs are well-known to the prior art and are offered in a variety of vertical and horizontal configurations. The racks usually feature pairs of guides or rails between which the object can be inserted and pushed until it touches a planar bottom plate. Since the exposed edges of the stored objects lie in a common plane, some spacing between the two adjacent objects must be provided in order to facilitate their extraction from the rack. Providing a sufficient gap between two adjacent objects considerably reduces the capacity of the rack. On the other hand, if the objects are held too closely to one another, it becomes very difficult to pull one of them out of the stack unless lateral edges are exposed and positioned at a practical distance from the edges of adjacent stacks of objects.

This invention results from attempts to overcome the limitations of storage and display racks of the prior art.

SUMMARY OF THE INVENTION

The principal and secondary objects of this invention are to provide a convenient way to select and extract a compact disc jewelcase or other similar objects having parallel and planar opposite faces when they are held contiguously to one another in a very compact arrangement, and to increase the capacity of such a storage and display rack by reducing the amount of spacing that might be required between adjacent units.

These and other valuable objects are achieved by installing in the bottom frame of the rack and in line with each stored object, a toggling mechanism that, when a light pressure is applied upon the exposed edge of one of the objects, the object is caused to pop out above or beyond the common plane in which the exposed face of all the other objects in the rack lie. The rack is dimensioned to be suspended like a folder in a common file drawer. Alternately, the rack can be dimensioned to form modules that mount to one another to form larger storage and display cases.

DESCRIPTION OF THE PREFERRED EMBODIMENT OF THE INVENTION

Figure 1:
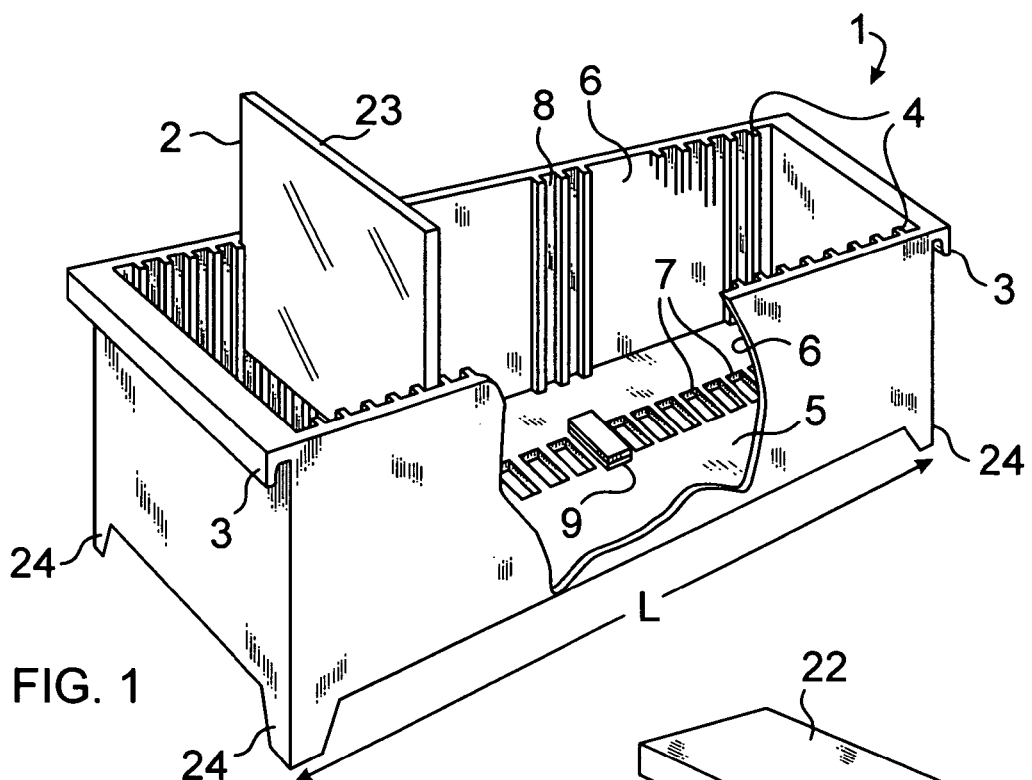
FIG. 1 is a perspective view of a table-top storage and display rack for compact discs with appropriate cut-outs exposing some of the case-popping toggling mechanisms.

Referring now to the drawing, there is shown in FIG. 1, a tray or rack 1 suitable for holding a number of compact discs in their jewelcases of which an exemplary one 2 is shown partially inserted. The tray can be stood on a table top or inserted into a file cabinet. The length L of the tray is substantially equal to the length of a standard file folder. Two flanged projections 3 along the upper lateral edges of the tray are shaped and dimensioned to engage the file-suspending rails found in most filing cabinet drawers. Further, the tray is equipped with downwardly projecting feet 24 for supporting the tray on a table-top.

Pairs of parallel guides 4 extend from the plate 5 forming the bottom of the tray, vertically along the inside surfaces 6 of the longitudinal walls. The guides are shaped and spaced apart to receive jewelcases 2. The thickness of each guide can be as small as 0.3 millimeters.

In the middle, and along the full length of the bottom plate 5, a series of windows 7 are cut in line with the spacings 8 between the guides. Each window is dimensioned to receive a toggling mechanism 9 of which only one is shown in FIG. 1.

Figure 2:
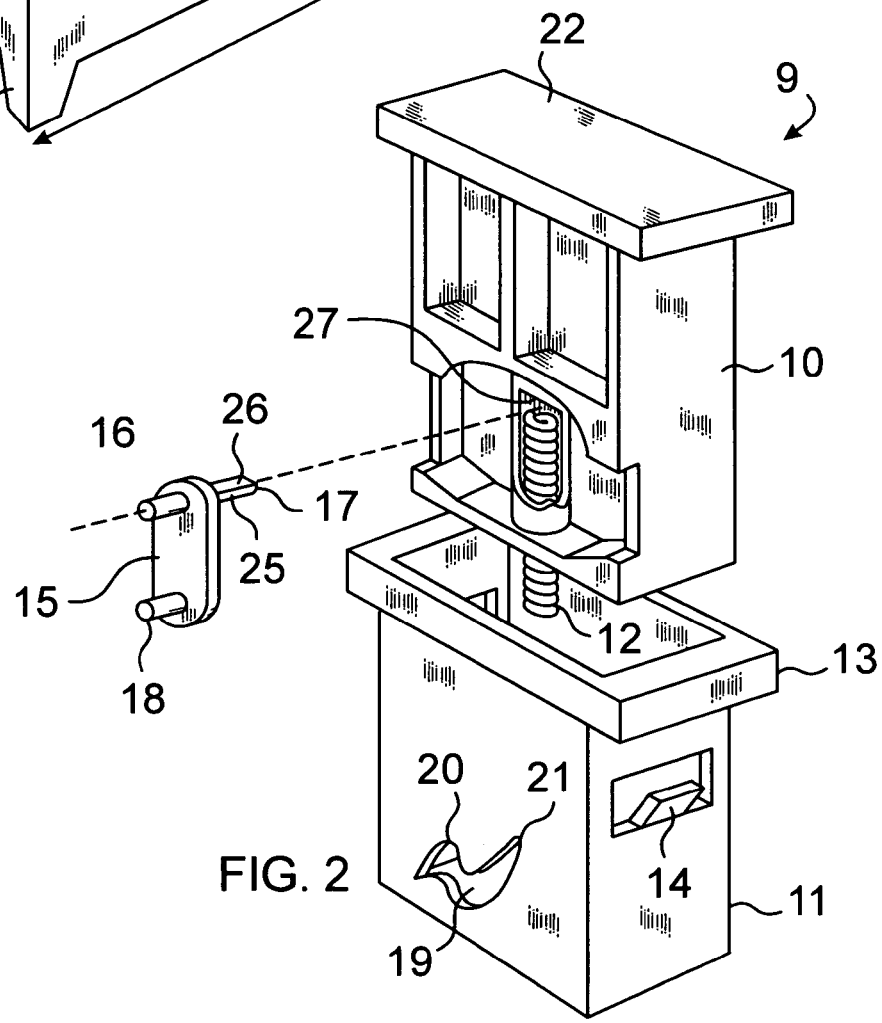
FIG. 2 is an exploded perspective view of the aforesaid mechanism.

The toggling mechanism 9 more specifically illustrated in FIG. 2 is of the type commonly used in connection with certain electrical push-buttons. The toggling mechanism comprises a plunger 10 engaged into a housing 11 and resiliently biased upwardly away from the housing by a compression coil spring 12. The upper part of the housing is framed by a flange 13 which rests against the top surface of the bottom plate 5. The housing is releasably secured by a pair of detent nibs 14 positioned to press against the underside of the bottom plate. Those skilled in the art will readily appreciate that the position of the flange and detent nibs may be reversed to allow mounting of the housing from below the bottom plate.

A toggling arm 15 has an upper shaft 16 rotatively captured in a bore of the plunger and is thereby pivotably mounted to it. A prong 17 projects rearwardly from the arm and is positioned coaxially with the upper shaft. The prong has a generally semi-cylindrical shape having a curved lower surface 25 and a flattened upper surface 26. The lower surface bears against the spring, and the upper surface is oriented to contact a flattened downwardly facing surface 27 of the plunger. When the spring is under compression, the corresponding flattened surfaces cause the toggling arm 15 to be biased toward a vertical position. A lower shaft 18 projects into a guiding window 19 cut into the housing 11 and shaped to alternately swing the arm 15 between a lower resting position 20 and a upper resting position 21 of the lower shaft 18 with each pressing action applied vertically upon the top plate 22 of the plunger.

It can now be understood that when all the toggling mechanisms are set in the lower position, the upper edges 23 of all the jewelboxes 2 inserted into the tray are at the same level. In order to conveniently select and pull out one of the jewelcases, it suffices to apply a slight downward pressure upon its top edge sufficient to overcome the upward spring bias of the toggling mechanism and to lower the jewelcase by approximately 2.0 millimeters. At that point, the lower shaft 18 of the arm 15 of the toggling mechanism swings away from its lower resting position 20, allowing the plunger 10 to move upwardly until the lower shaft 18 stops in its upper resting position 21. The selected jewelcase pops up until its top edge 23 rests about 10 millimeters above the top edges of the others in the tray. The popped-up jewelcase can be conveniently grabbed and extracted from the tray.

Up to ten standard compact disc jewelcases, each 10 millimeters in thickness, can be held within about 11 centimeters of such a rack.

Figure 3:
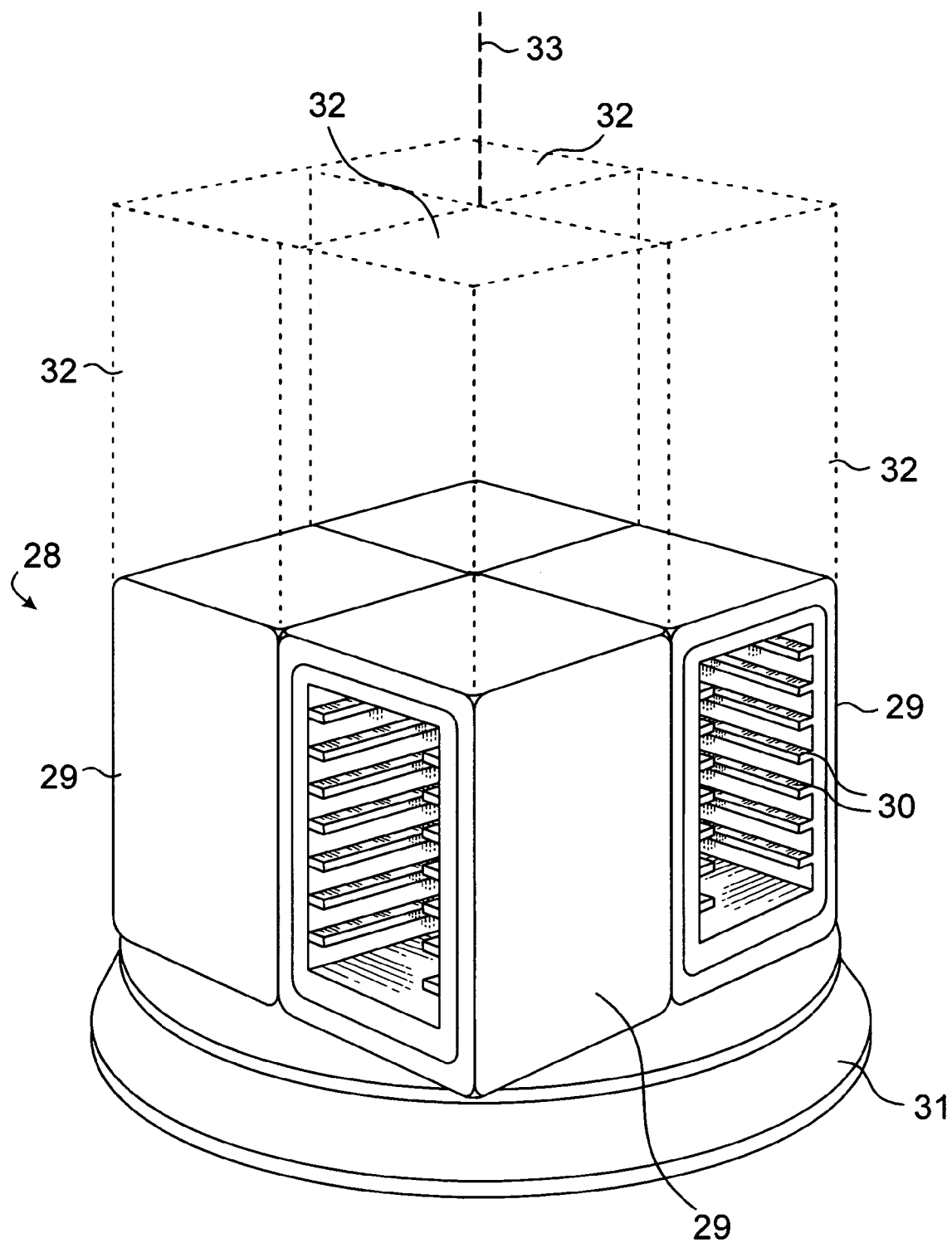
FIG. 3 is a perspective view of a storage and display case having a number of modular co-mountable trays.

Referring now to FIG. 3, there is shown an alternate embodiment of a media storage and display case 28 having four vertically co-mounted modular racks or trays 29 each having guides 30 projecting laterally and toggling mechanisms according to the previous embodiment. An angularly adjacent pair of trays are oriented substantially orthogonally to one another. The trays are mounted upon a rotating base 31 which allows rotation of the case around a vertical axis 33. Additional trays 32 may be mounted atop the case to enlarge its capacity.

While the preferred embodiments of the invention have been described, modifications can be made and other embodiments may be devised without departing from the spirit of the invention and the scope of the appended claims.

What is claimed is:

1. A rack for contiguously storing and displaying a number of symmetrical objects having parallel, planar opposite faces, said rack comprising:
   a bottom frame;
   a plurality of pairs of guides projecting substantially orthogonally from said bottom frame, each of said pairs of guides being shaped, dimensioned and positioned to removably hold one of said objects; and
   a toggling mechanism in said bottom frame associated with each of said pairs of guides and positioned to outwardly push an object held between said pair of guides, said mechanism being actuatable by movement of said object; and,
   wherein said toggling mechanism comprises a spring and a toggling arm.

2. The rack of claim 1 which further comprises a pair of flanged projections extending laterally from said rack and shaped and spaced-apart to capture the hanging folder rails of a common filing cabinet.

3. The rack of claim 1, wherein said rack further comprises means for releasably mounting said toggling mechanism to said bottom frame.

4. The rack of claim 3, wherein said means comprise a window cut through said bottom frame associated with said toggling mechanism, said window being sized and shaped to accept an intimately bear against a housing portion of said toggling mechanism.

5. The rack of claim 1, wherein a first guide of said pairs of guides has a first thickness of about 0.3 millimeter.

6. The rack of claim 1, wherein said toggling mechanism comprises:
   a plunger portion slidingly engaged in a housing portion;
   said plunger being biased away from said housing portion; and
   a toggling arm for alternately locking said plunger in a lower resting position and an upper resting position upon the application and subsequent release of a downward force overcoming said bias.

7. The rack of claim 6, wherein said toggling mechanism further comprises:
   said toggling arm being pivotably mounted to said plunger; and
   a shaft extending from said arm into a guide window in said housing.

8. A rack for contiguously storing and displaying a number of symmetrical objects having parallel, planar opposite faces, said rack comprising:
   a bottom frame;
   a plurality of pairs of guides projecting substantially orthogonally from said bottom frame, each of said pairs of guides being shaped, dimensioned and positioned to removably hold one of said objects; and
   a toggling mechanism in said bottom frame associated with each of said pairs of guides and positioned to outwardly push an object held between said pair of guides;
   wherein said toggling mechanism comprises:
   a spring;
   a plunger portion slidingly engaged in a housing portion;
   said plunger being biased away from said housing portion;
   a toggling arm for alternately locking said plunger in a lower resting position and an upper resting position upon the application and subsequent release of a downward force overcoming said bias;
   said toggling arm being pivotably mounted to said plunger; and
   a shaft extending from said arm into a guide window in said housing;
   wherein said toggling mechanism further comprises:
   a semi-cylindrical prong projecting from said arm; and
   said prong having a first flattened surface for bearing against a correspondingly second flattened surface of said plunger during application of said downward force, thereby causing pivoting motion in said arm.

9. The rack of claim 8, wherein said toggling mechanism further comprises said window being shaped to alternately swing said arm between said lower resting position and said upper resting position.

10. The rack of claim 1, wherein said rack further comprises said bottom frame being mounted substantially vertically to a display case so that said guides project laterally with respect to said case.

11. The rack of claim 10, wherein said rack further comprises a rotating base mounted to said case thereby allowing said rack to revolve about a substantially vertical axis.

12. A display case comprises a first and second rack according to claim 1.

13. The display case of claim 12, wherein said first and second racks are mounted vertically such that a bottom frame of said first rack is oriented orthogonally to the bottom frame of said second rack.

14. The display case of claim 13, wherein said case further comprises a rotating base thereby allowing said racks to revolve around a vertical axis.

* * * * *